June 2, 1942.  E. C. HORTON  2,284,823
WIPER BLADE
Filed July 13, 1939
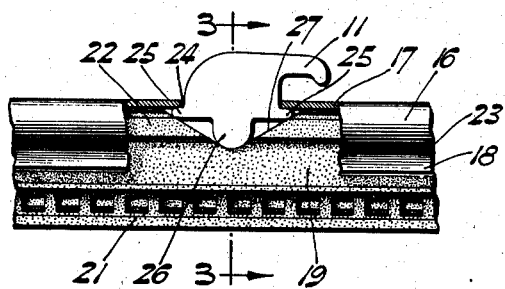
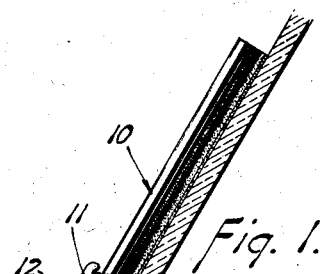
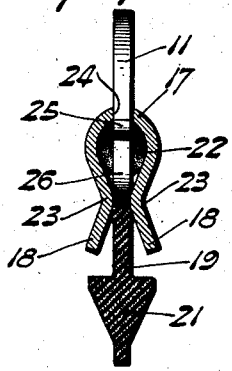
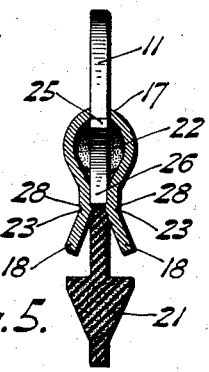
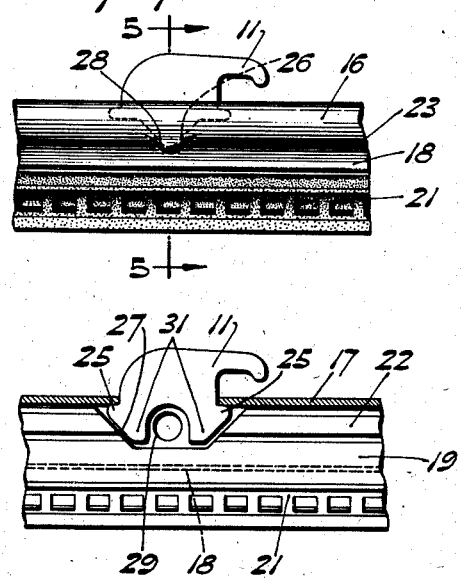
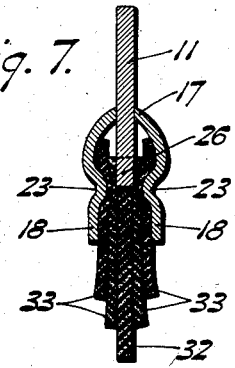
INVENTOR
Erwin C. Horton
BY
Bean, Brooks, Buckley & Bean.
ATTORNEYS Patented June 2, 1942

2,284,823

UNITED STATES PATENT OFFICE 2,284,823

WIPER BLADE

Erwin C. Horton, Hamburg, N. Y., assignor to Trico Products Corporation, Buffalo, N. Y.

Application July 13, 1939, Serial No. 284,294

5 Claims. (Cl. 15—250)

This invention relates to windshield cleaners and the like, and has particular relation to the wiper blades of such cleaners.

According to conventional practice, a wiper blade consists of a channel-shaped holder, usually formed of metal, with one or more strips of rubber, or similar resilient material, received within the channel of the holder, and an attaching fin secured to the back of the holder for connecting the blade to a supporting arm. The fin is usually a flat metal stamping which extends through an elongated opening formed in the back, or web, of the channel-shaped holder, the fin having shoulders engaging the under surface of the web adjacent the ends of the opening.

The sides or flanges of the holder are spaced more widely than the thickness of the fin and as a result there is considerable play between the fin and holder, movement being permitted particularly about the longitudinal axis of the opening which is formed in the web of the holder.

According to the present invention, the several parts of the blade are so formed and arranged that such play is obviated, and the attaching fin and the holder are substantially rigidly connected.

These and other objects and advantages will become apparent from the following description of the typical embodiments of the invention illustrated in the accompanying drawing, wherein:

Fig. 1 is a fragmentary sectional view through an automobile windshield, showing wiping means including the present invention in operative relation thereupon;

Fig. 2 is a fragmentary elevational view of a wiper blade, with parts cut away and appearing in section;

Fig. 3 is a cross-sectional view taken along line 3—3 of Fig. 2;

Fig. 4 is a fragmentary elevational view of a wiper blade of modified form;

Fig. 5 is a cross-sectional view taken along line 5—5 of Fig. 4;

Fig. 6 is a longitudinal sectional view through a further modified blade; and,

Fig. 7 is a cross-sectional view of still another modified form of blade.

As shown in Fig. 1, the blade 10 has an attaching fin 11 by which it is connected to the slotted end 12 of a wiper arm 13, the latter being movable by oscillation of its supporting shaft 14 to wipe the blade over the surface of windshield glass 15.

In the form of the invention shown in Figs. 2 and 3, the wiper blade includes a holder 16 of generally channel-shape, with a back or web portion 17 and opposed flanges 18. A wiping element 19 of rubber, or similar material, has a bead 21 of generally triangular cross-section formed along the wiping edge thereof, and a bead 22 of hexagonal cross-section formed along the opposite edge thereof and received between the flanges 18 of the holder. Opposed portions 23, 23 of the flanges are deformed inwardly to retain the wiping element therebetween. When the wiping element is provided with a bead, such as indicated at 22, the inwardly deformed portions 23, 23 need be only so close together that the bead cannot pass between them, although when the bead is omitted or is of very small cross-section, it may be desirable for the portions 23, 23 to be clamped against the wiping element.

An elongated opening 24 is provided in the back or web 17 of the holder, for passing the attaching fin 11. The latter has shoulders 25 formed thereon for engaging the parts of the web 17 adjacent the ends of opening 24, thereby preventing displacement of the fin from the holder.

According to the present invention, a finger 26 is formed on the fin which extends toward the wiping edge of the blade to a point between the inwardly deformed portions 23, 23, the wiper element 19 having a notch or recess 27 to receive the finger.

As shown in Fig. 3, the inwardly deformed portions 23, 23 of the flanges may contact the finger 26 of the fin, thereby holding it against movement relative to the holder.

In the form of the invention illustrated in Figs. 4 and 5, the inwardly deformed portions 23, 23 of the flanges 18 of the holder are brought more closely together than in the form shown in Figs. 2 and 3 so that the metal of the flanges is formed about the extremity of finger 26 of the fin, as indicated on the drawing at 28. By this formation the fin is firmly interlocked with the holder, being anchored against any movement relative thereto.

In the form of the invention illustrated in Fig. 6, the structure is substantially like that shown in Figs. 2 and 3 except that the finger 26 on the fin 11 is replaced by a pair of fingers 31, and an opening 29 is formed in each of the flanges of the holder to receive a screw or rivet fastener which may be used to secure the blade to an arm of another type from that shown in Fig. 1, the screw or rivet passing through the blade between the fingers 28, 28.

In the form of the invention shown in Fig. 7, the structure is similar to that shown in Figs. 2 and 3 except that the wiping element consists of a plurality of plies of rubber or other wiping material. In this illustrated embodiment the inwardly deformed portions 23, 23 of flanges 18 of the holder do not contact the finger 26 depending from fin 11, but the finger is firmly held between the outer plies 33, 33 of the wiping element which are clamped together by the deformed portions 23, 23, so that substantially the same result is obtained, the fin being held against angular movement relative to the holder. In this illustrated form only the center ply 32 of the wiping element is recessed to receive the finger, although, if desired, one or more of the outer plies may also be recessed.

It will be understood that the wiper blades herein shown and described are merely illustrative of the inventive principles involved which may be otherwise embodied without departing from the spirit of the invention or the scope to which the appended claims are entitled.

I claim:

1. In a wiper blade, a channel-shaped holder having a web portion with an opening therein and opposed outwardly directed flanges, said flanges having indentations formed therein providing a restriction in the space between the flanges at a point spaced from the web portion, a wiping element disposed in said holder and clamped between said indentations, said element having a recess therein adjacent the opening in the web, and a wiper arm connecting member extending through said opening in the web in said recess and having a portion disposed between said indentations of the flanges at a point spaced outwardly from said web portion, said member being of greater thickness than the wiping element as clamped between said portions and the material of the indentations of said flanges adjacent said member being formed about the edge portions thereof.

2. In a wiper blade, a channel-shaped holder having a web portion with an opening therein and opposed outwardly directed flanges with substantially opposed indentations providing a restriction in the space between the flanges at a point spaced from the web portion, a blade attaching member extending through said opening in the web and having a part disposed between said indentations, a wiping element disposed in said holder and clamped between said inwardly deformed portions, said wiping element comprising a plurality of plies of which the center ply has a recess in the inner edge thereof, and the blade attaching member extending into said recess and there being held clamped between the outer plies of said wiping element by said indentations.

3. In a wiper blade, a channel-shaped holder having a web and opposed outwardly directed flanges, the web having a slot therein and a plate-like member for attaching the blade to a wiper extending through said slot, a wiper element having a bead along its inner edge engaged between the flanges of the holder and having a recess adjacent the slot, the flanges being deformed toward each other to provide a restricted zone in the channel of the holder spaced substantially outwardly from the web to retain the wiper in the channel by engagement with said bead, said member having shoulders engaging the web of the holder at the ends of the slot, and said member having a stabilizing part received in said recess in the bead and extending into said restricted zone, the deformed portions of the flanges cooperating with the walls of said slot in securing the attaching member to the holder.

4. In a wiper blade, a channel-shaped holder having a web and opposed outwardly directed flanges, the web having a slot therein and a plate-like member for attaching the blade to a wiper extending through said slot, a flexible wiper engaged between the flanges and provided with a recess adjacent said slot, the flanges having parts extending toward each other to provide a restricted zone in the channel of the holder spaced substantially outwardly from the web to retain the wiper in the channel, said member having shoulders engaging the web of the holder at the ends of the slot, and said member having a stabilizing part received in said recess and extending into said restricted zone, being held between said extending parts of the flanges to hold the attaching member substantially against movement about the longitudinal axis of the slot.

5. In a wiper blade, a channel-shaped holder having a web and opposed outwardly directed flanges, the web having a slot therein and a plate-like member for attaching the blade to a wiper extending through said slot, a flexible wiper engaged between the flanges and provided with a recess adjacent said slot, the flanges being deformed toward each other to provide a restricted zone in the channel of the holder spaced substantially outwardly from the web, and said member having a stabilizing part received in said recess and extending into said restricted zone, being clamped between said deformed portions of the flanges to hold the attaching member substantially against movement about the longitudinal axis of the slot.

ERWIN C. HORTON.